Feb. 1, 1955　　　K. M. FEIERTAG　　　2,701,318
DYNAMOELECTRIC MACHINE CASING
Filed Nov. 22, 1952
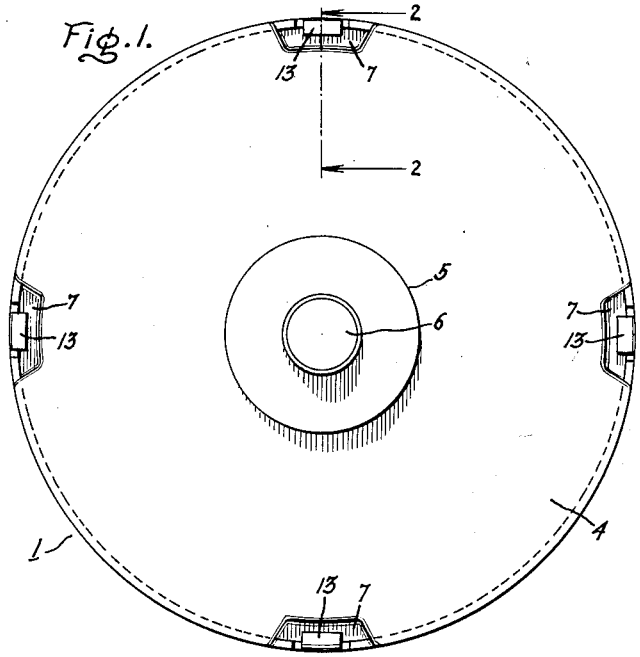
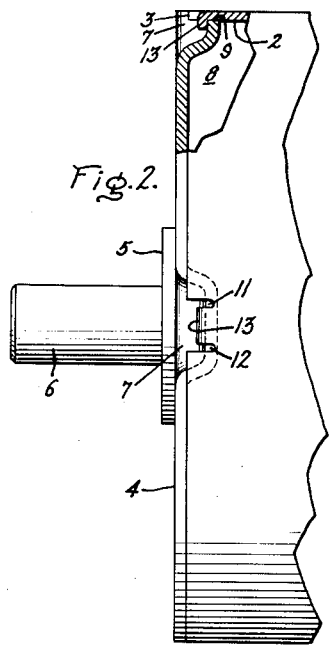
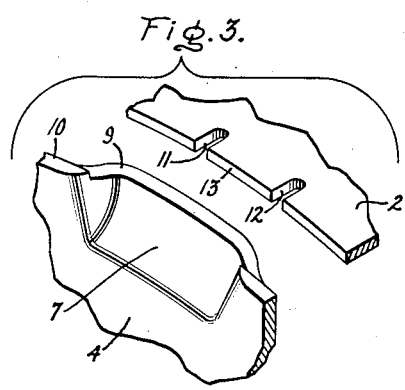
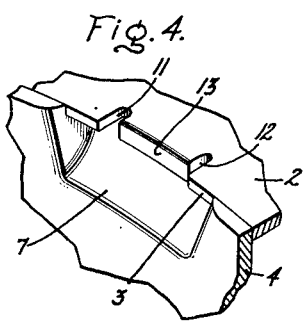
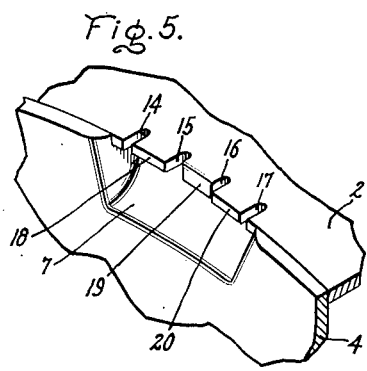
Inventor
Karl M. Feiertag
by Robert G. Iris
His Attorney United States Patent Office 2,701,318
Patented Feb. 1, 1955

2,701,318

DYNAMOELECTRIC MACHINE CASING

Karl M. Feiertag, Fort Wayne, Ind., assignor to General Electric Company, a corporation of New York Application November 22, 1952, Serial No. 322,013

7 Claims. (Cl. 310—258)

This invention relates to dynamoelectric machines and more particularly to machines of the type having a cylindrical shell enclosing the stator.

Many small dynamoelectric machines, particularly fractional horsepower motors, are provided with a cylindrical steel shell enclosing the stator and with substantially flat steel end shields supporting the bearings of the machine and completing the enclosure. In the past, such end shields have been provided with a male rabbet on their outer peripheries fitting snugly into the inner periphery of the stator shell thereby assuring concentricity. The end shields are then held in assembled relation by clamp bolts which pass through both end shields and the full length of the shell. It is desirable, therefore, to provide a dynamoelectric machine having a stator shell member in which the end shields are held in position without the use of clamp bolts, however, without sacrificing good rabbeting or machined square ends on the shell.

It is therefore an object of this invention to provide an improved dynamoelectric machine construction incorporating the desirable features set forth above.

Further objects and advantages of this invention will become apparent and the invention will be better understood by reference to the following description and accompanying drawing, and the features of novelty which characterize this invention will be pointed out with particularity in the claims annexed to and forming a part of this specification.

In accordance with this invention, a dynamoelectric machine is provided having a shell member and an end shield member abutting the end of the shell member. The shell member is provided with a tab formed on its peripheral edge which is bent over and engages the outer surface of the end shield member thereby securing the end shield member to the shell. More specifically, the end shield member is formed of a substantially flat sheet of relatively thin material and has an inwardly depressed recess formed in its outer periphery extending into the shell member. The outer edge of this recess is within the outer periphery of the end shield member thereby forming a rabbet connection with the inner surface of the shell. The shell member has a pair of spaced apart slots formed in its peripheral edge defining a tab, which tab is bent over into the recess in the end shield member and engages the inner wall thereof. This construction, therefore, permits a substantially flat end shield member to be secured against the machined peripheral edge of the shell member thus insuring concentricity without the necessity for providing sufficient material in the end shield member to machine a rabbet and further without the necessity for providing clamp bolts.

In the drawings,

Fig. 1 is an end view of the improved dynamoelectric machine construction of this invention;

Fig. 2 is a side elevational view broken away along the line 2—2 of Fig. 1 further illustrating the improved construction of this invention;

Fig. 3 is a fragmentary exploded view illustrating the manner of assembly of the machine of Fig. 1;

Fig. 4 is a further fragmentary view showing the assembled end shield and shell members; and Fig. 5 is another fragmentary view illustrating a modification of this invention.

Referring now to Figs. 1, 2, 3 and 4, there is shown a dynamoelectric machine generally identified as 1 having a cylindrical shell member 2, formed of suitable relatively thin sheet material, such as steel, in which the stator of the machine (not shown) is positioned. The peripheral edge 3 of the shell member 2 is machined to make it concentric with the axis of the machine and an end shield member 4, also formed of suitable relatively thin sheet material, such as steel, is arranged abutting the peripheral edge 3 of stator shell 2. End shield member 4 carries a suitable bearing 5 which rotatably supports shaft 6 of the machine.

In order to secure end shield member 4 to stator shell 2, a plurality of inwardly depressed recesses 7 are formed around the outer periphery of end shield member 4 and extending into the cavity 8 defined by end shield member 2. The upper edges 9 of recesses 7 are within the outer peripheral edge 10 of end shield member 4 thus providing a rabbet connection with stator shell 2, as more clearly shown in Figs. 3 and 4. Stator shell member 2 has a plurality of pairs of spaced apart slots 11 and 12 formed in its peripheral edge respectively defining tab portions 13. After end shield 4 has been arranged abutting peripheral edge 3 of shell member 2 and with tabs 13 in alignment with recesses 7, the tabs 13 are bent over into the recesses 7 and engaging the inner wall thereof as shown in Figs. 1, 2 and 4. The bent over tabs 13 therefore hold the end shield member 4 in assembled relation with the shell member 2 without necessity for clamp bolts.

It may be found desirable to provide for several assemblies and disassemblies of the end shield 4 and stator shell member 2. In order to provide this feature, the arrangement of Fig. 5 is provided in which instead of having a single tab 13 associated with each recess 7, a plurality of shell slots 14, 15, 16 and 17 are formed in the peripheral edge of shell member 2 respectively define tabs 18, 19 and 20. Here, during the first assembly operation, only one of the tabs, for example tab 19 is bent over into recess 7 with the other two tabs 18 and 20 being left in their original position. When it is necessary to disassemble the machine, the tab 19 may be bent up and broken off and one of the remaining tabs 18 and 20 may be used to secure end shield 4 to the stator shell member 2 during the next assembly operation.

It will now be readily apparent that this invention provides an improved construction for a dynamoelectric machine having a stator shell member and a substantially flat end shield member wherein the necessity for machining a rabbet on the end shield member and for providing clamp bolts to secure the end shields to the shell is eliminated. It will be seen that the location of the tabs 13 on the shell 2 does not interfere with the operation of facing the ends of the shell to secure proper alignment of the rotor within the stator. It will also be seen that this invention provides a simple and inexpensive construction which can be assembled by relatively inexperienced personnel.

While I have shown and described specific embodiments of this invention, further modifications and improvements will occur to those skilled in the art. I desire that it be understood therefore that this invention is not limited to the form shown and I intend in the appended claims to cover all modifications which do not depart within the true spirit and scope of this invention.

What I claim as new and desire to secure by Letters Patent of the United States is:

1. In a dynamoelectric machine having a stator, a shell member surrounding said stator, and an end shield member abutting an end of said shell member, said end shield having an inwardly depressed recess formed on its outer periphery extending into said shell member, said shell member having a tab formed on its peripheral edge, said tab being bent over into said recess and engaging the inner wall thereof thereby securing said end shield member to said shell member.

2. In a dynamoelectric machine having a stator, a cylindrical shell member surrounding said stator formed of relatively thin sheet material, and a substantially flat end shield member formed of relatively thin sheet material abutting an axial end of said shell member, said end shield member having an inwardly depressed recess formed on its outer periphery extending into such shell member, said shell member having a tab formed on its peripheral edge, said tab being bent over into said recess and engaging the inner wall thereof thereby securing said end shield member to said shell member.

3. In a dynamoelectric machine having a stator, a cylindrical shell member surrounding said stator formed of relatively thin sheet material, and a substantially flat end shield member formed of relatively thin sheet material abutting an axial end of said shell member, said end shield member having an inwardly depressed recess formed on its outer periphery extending into said shell member, said shell member having a pair of spaced-apart slots formed in its peripheral edge defining a tab, said tab being bent over into said recess and engaging the inner wall thereof thereby securing said end shield member to said shell member.

4. In a dynamoelectric machine having a stator, a cylindrical shell member surrounding said stator formed of relatively thin sheet material, and a substantially flat end shield member formed of relatively thin sheet material abutting an axial end of said shell member, said end shield member having an inwardly depressed recess formed on its outer periphery extending into said shell member, the outer edge of said recess being within the outer periphery of said end shield member thereby forming a rabbet connection with the inner surface of said shell member, said shell member having a pair of spaced-apart slots formed in its peripheral edge defining a tab, said tab being bent over into said recess and engaging the inner wall thereof thereby securing said end shield member to said shell member.

5. In a dynamoelectric machine having a stator, a cylindrical shell member surrounding said stator formed of relatively thin sheet material, and a substantially flat end shield member formed of relatively thin sheet material abutting an axial end of said shell member, said end shield member having a plurality of spaced-apart inwardly depressed recesses formed around its outer periphery respectively extending into said shell member, the outer edges of said recesses being within the outer periphery of said end shield member thereby respectively forming rabbet connections with the inner surface of said shell member, said shell member having a plurality of pairs of spaced-apart slots formed in its peripheral edge respectively defining a plurality of tabs, said tabs being respectively bent over into said recesses and respectively engaging the inner walls thereof thereby securing said end shield member to said shell member.

6. In a dynamoelectric machine having a stator, a cylindrical shell member surrounding said stator formed of relatively thin sheet material, and a substantially flat end shield member formed of relatively thin sheet material abutting an axial end of said shell member, said end shield member having an inwardly depressed recess formed on its outer periphery extending into said shell member, said shell member having a plurality of spaced-apart slots formed in its peripheral edge respectively defining a plurality of tabs, one of said tabs being bent over into said recess and engaging the inner wall thereof thereby securing said end shield member to said shell member.

7. In a dynamoelectric machine having a stator, a cylindrical shell member surrounding said stator, and an end shield member abutting an end of said shell member, said end shield having an inwardly depressed recess formed on its outer periphery extending into said shell member said shell member having a plurality of spaced-apart tabs formed on its peripheral edge, one of said tabs being bent over into said recess and engaging the inner wall thereof thereby securing said end shield member to said shell member.

References Cited in the file of this patent

UNITED STATES PATENTS

| Number | Name | Date |
|---|---|---|
| 1,270,758 | Wilson | June 25, 1918 |
| 1,514,930 | Reynolds | Nov. 11, 1924 |
| 1,557,000 | Kuhls | Oct. 13, 1925 |
| 1,609,531 | Woolson | Dec. 7, 1926 |
| 1,710,999 | Schmid | Apr. 30, 1929 |